Feb. 13, 1951     D. H. CHRISTOPHER ET AL     2,541,637
METHOD OF VAPORIZING LINDANE IN VENTILATED ROOMS
Filed July 25, 1950
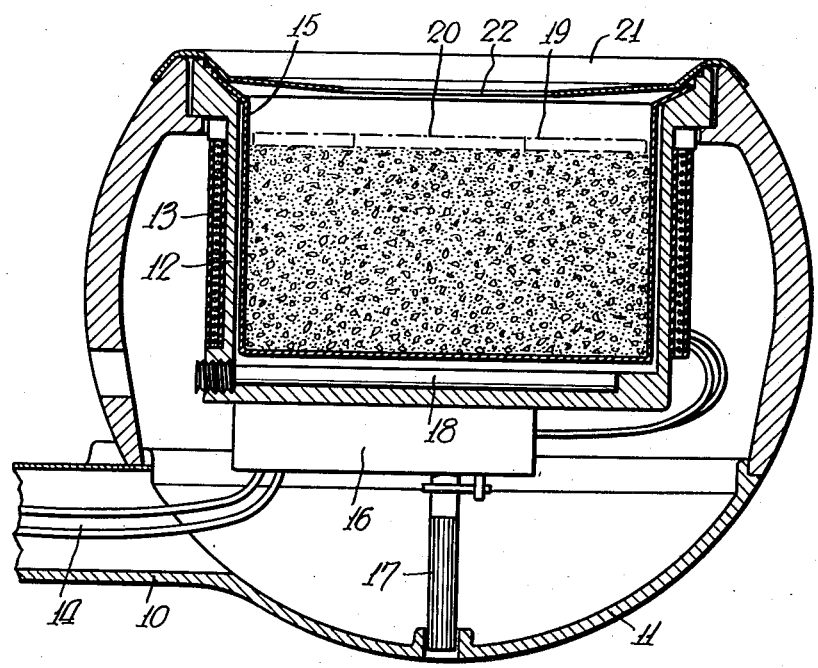
INVENTOR
David H. Christopher
Philip J. Spear
BY
Dean Fairbank & Hirsch
ATTORNEYS Patented Feb. 13, 1951

2,541,637

UNITED STATES PATENT OFFICE 2,541,637

METHOD OF VAPORIZING LINDANE IN VENTILATED ROOMS

David H. Christopher, Levittown, N. Y., and Philip J. Spear, Amherst, Mass., assignors to American Aerovap, Inc., a corporation of New York Application July 25, 1950, Serial No. 175,716

8 Claims. (Cl. 167—39)

1

The present invention is concerned with the art of maintaining substantially free from insect life, rooms, including ventilated rooms for human occupancy, such as restaurants, auditoriums and the like, by resort to the chemical known as lindane, which is the gamma isomer of hexachlorocyclohexane of purity better than 99 per cent.

It is known that lindane is efficacious as an insecticide when applied liberally in solution or emulsified suspension as a spray or when admixed with talc or clay as a dust in the open air. But such mode of use for maintaining substantially insect-free, rooms occupied by human beings is unfeasible because with the constant change of air in the ventilation of such rooms and the opening of doors and windows the lindane soon escapes so that the relief from insect life at best is but temporary, while frequent spraying or dusting of lindane within a room not only may prove toxic to human beings and injurious to the furnishings by reason especially of the solvent, emulsifier or dusting agent, but by reason of the high cost of the lindane the expense becomes prohibitive.

It is accordingly among the objects of the invention to provide a method by which lindane is applied efficiently, economically and automatically for constantly maintaining in a ventilated room for human habitation, such as an auditorium, a restaurant, or the like, in which the air is changed more or less continuously, an environment lethal and repellent to flies, mosquitoes, and other insects and this without detectible toxic effect upon human occupants or pets, without harmful effect to food or floral life, or staining or impairment of furniture, mural decorations, fabrics, drapes, or other furnishings in the room.

The invention is based upon the surprising discovery that when lindane is constantly evaporated into the room or chamber at an almost infinitesimal rate which is between 0.4 and 15 micrograms per hour per cubic foot of the treated room, depending directly on the average frequency of air-change, the lethal effect upon insect life entering or remaining in the room is devastating, yet without the slightest trace of toxic effect upon human beings or pets, regardless of how long they may remain in the room and without awareness on the part of even the most sensitive individual of the presence of such vapor in the room, and without the slightest impairment or change in the taste of any food products exposed in the room, and without staining or other injury to delicate fabrics exposed in the room.

2

The method set forth is not only effective for killing within three hours or less, flies and mosquitoes that may infest the room or chamber and to serve as a repellent against their entry from the exterior, but is likewise lethal to gnats, moths, roaches, and kindred species such as ticks, lice, ants, spiders, and other Arachnida.

Apparently the lindane diffused in the atmosphere in the minor concentration set forth, functions as a competitive metabolite to block vital physiological processes of the central nervous system of the insect, giving rise to convulsions evidenced by erratic behavior of the pest shortly after exposure and resulting in death.

Experience has shown on the other hand, that lindane when evaporated at the extremely slow rate set forth and diffused throughout the room is of concentration but a negligible fraction of the threshold of toxicity to human beings and causes no skin lesions, irritation, or effect on the central nervous system or on the function of the liver, kidneys or blood cells, of humans or other mammals, young or old. Tests have further shown no evidence of accumulation or storage in the body of the human or other mammal beyond the point of excretion. Any microscopic accumulation resulting from continued exposure for many weeks to concentrations of lindane up to 50 times that which is lethal to insect life, completely disappears from the body of human beings and other higher form of life in two weeks without after-effect.

In carrying into practice the method of the invention, the lindane is evaporated at the almost infinitesimal rate desired, by heating, preferably by resort to an appropriate electric heater applied to a mass of the lindane within an appropriate open vessel. If a mass containing lindane is heated to maintain a temperature of 90 to 130 degrees C. thereunder, lindane vapor will pass from the surface by constant and sustained evaporation at the rate of .15 to 4 milligrams per hour per square centimeter of exposed mass. If a mass of lindane, in small crystals resembling granulated sugar in appearance, as is ordinarily preferred, is heated to maintain a temperature of about 110 degrees C. thereunder, lindane vapor will pass from the surface of the solid lindane by constant and sustained sublimation directly to the molecular vaporous form at the rate of approximately 0.8 milligram per hour per square centimeter of exposed lindane. In a typical installation 90 grams of the lindane maintained in an appropriate aluminum cup, eight (8) centimeters in diameter, when heated so as to maintain a temperature of roughly 110 degrees C. at the bottom of the cup, will evolve the vapor of lindane by constant and sustained sublimation from the solid crystals directly into the molecular vaporous form at the rate of approximately .04 gram per hour, that is equivalent to 1 gram per day. That rate of evaporation into a room of 20,000 cubic feet is equivalent to the treatment of 400 cubic feet per square centimeter of exposed lindane surface or 2 micrograms per hour per cubic foot, a rate which is adequate for killing in three hours or less, the flies or mosquitoes in such room even when constantly ventilated and maintaining the room substantially free of such insects thereafter.

For a room larger than 20,000 cubic feet, or one that has more than the usual amount of air movement, heat could be applied to the typical installation referred to, to maintain a higher temperature at the bottom of the cup, say of 113 degrees C. or 115 degrees C. with evolution of vapor at .06 to 0.3 gram per hour or 1.5 to 7 grams per day. It is, however, ordinarily preferred in such cases, to use two or more of the vaporizing equipments, each set at 110 degrees C. for such heavy duty.

Lindane vapor evolution at rate between 0.4 and 15 micrograms per hour per cubic foot of the room to be treated is efficacious for its intended purpose of killing insects, and harmless to human and other mammalian life, but in ordinary commercial practice the rate of evolution of 1 to 4 micrograms per hour per cubic foot is preferred. Equipment evolving the vapors at the rate of .04 gram per hour is lethal to insect life and harmless to human beings in a ventilated room even as small as one of 2,000 cubic feet capacity.

Where the room is of materially less volume than 20,000 cubic feet, and the air therein remains relatively stagnant as well, or where the room to be treated is very small, the rate of evaporation can be reduced to avoid exceeding the desired small concentration of lindane in the air, and for convenience in commercial practice, and without change of the preferred applied temperature of 110 degrees, by blocking to predetermined extent the escape of lindane vapor from the equipment. This may be accomplished by the simple expedient of reducing the area of lindane exposed to the air as by placing an appropriate shield, guard or baffle over the lindane. That guard or baffle is desirably a plate that rests upon the lindane and covers a portion only of its exposed surface. The greater the proportion of lindane surface covered, the less the rate of vapor evolution under the applied temperature of about 110 degrees C., down to as little as .008 gram or less per hour or 0.2 gram or less per day.

While, for the purpose set forth, a disc of suitable material, such as glass, ceramic, plastic or metal, illustratively anodized aluminum, smaller in diameter than that of the cup, could be laid upon the lindane, this would not afford the optimum control because such disc could not readily be centered unless the same were provided with spokes to engage the wall of the cup and the rate of vapor evolution would vary with the extent of off-center placement of the disc. It is therefore preferred to use rings or annuli of outer diameter equal to the inside diameter of the cup and of inner diameter selected to correspond to the rate of vapor evolution desired.

To shield the lindane carrying cup from excessive air movement, as for instance that created by a nearby fan, it is preferred to place a ring over the rim of the cup, well above the lindane. Such ring also performs to a certain degree the function of the ring or disc laid upon the surface of the lindane. It is important that the inner diameter of such ring that rests on the rim of the cup be large enough to afford ready escape of vapor at the desired rate.

Alternatively the rate of vapor evolution may be reduced by dilution of the lindane with appropriate relatively inert non-volatile, powdered diluent such as clay, talc or garnet dust. Less desirably a plasticizer substantially non-volatile at the temperature of use, either in solid or liquid form could be used as diluent. A preferred solid plasticizer diluent, inert and substantially non-volatile under the conditions of use is D. P. P. (diphenylphthalate). A preferred liquid plasticizer diluent, inert and substantially non-volatile under the conditions of use is tricresyl phosphate.

While the thermostatically controlled electric heater maintains a temperature of about 110 degrees C. at the bottom of the cup, which is only slightly below the melting point of lindane (112 degrees C.), yet the surface of the lindane at the center of the cup and almost to its wall, has a temperature maintained at only 75 to 80 degrees C. This sharp differential between the heating temperature applied and the temperature at the surface, is accounted for largely by the exceptionally high heat of vaporization of lindane and to some degree by heat losses in the equipment and by the low heat conductivity of the substance in its crystalline as distinguished from its molten or liquid form. In vaporization of lindane such heat is abstracted from the remaining crystals, thereby effectively cooling the same. This action is very desirable inasmuch as it effectively avoids melting or excessively heating the lindane and thus guards against possible injury to persons or objects in the room and also effectively guards against decomposition of the chemical in the cup and thus are avoided loss in insect killing efficacy or increase in toxicity to human beings. Moreover, such action gives greater assurance of uniformity of output than operation at much higher temperature in which the lindane is maintained in molten condition.

In operation the lindane vapor evolves slowly from the container under the applied heat and promptly diffuses through the entire room. But in the course of cooling, some of the vapor will condense into either the liquid or the solid form, more especially upon motes or dust particles floating in the air, from which condensate slow evaporation may again take place by virtue of the high vapor pressure of lindane, and a condition be maintained in the room in which, in addition to condensed particles constantly being produced and carried about by convection of the air moving in the room, and in part escaping through doors, windows and crevices, lindane will be maintained predominantly in the vapor phase as a diffusion in molecular state pervading the air in the room.

The concentration of lindane in the air under the conditions of use always remains far below the saturation point, and in a room liberally ventilated, it would be but in the neighborhood of 2 to 10 per cent of saturation. Air saturated with lindane at about room temperature contains 3.5 to 20 micrograms of lindane per cubic foot, or 0.1 to 0.6 microgram per liter, depending on the exact temperature, moisture and dust content, etc.

The condensed particles of lindane which appear to range in size up to 20 microns in diameter move about with the air currents and those that are in the neighborhood of .5 micron or more are thus moved and also slowly settle by gravity in accordance with Stokes' law according to which the velocity in feet per minute is approximately $0.020 \times$ the square of the radius in microns.

The toxic effect of the molecular diffusion of lindane is considerably enhanced when the insect comes into contact with particles of condensed lindane. Those particles larger or smaller, that have settled on the walls or other surfaces are particularly lethal to the insect when it alights. Condensed particles of lindane, in the order of 3 to 20 microns diameter are apparently destructive to the insect in flight in the lindane-charged atmosphere, since the insect is bound to come into contact with one or more of them before it has been in the room very long, very small condensed particles of less than one micron in diameter appear to be less lethal as long as they are air borne than the molecular diffusion or the air borne larger particles, because these very small floating particles, tend to pass by stream-line flow about rather than into contact with the insect in flight.

It is preferred to affix the heating equipment including the cup of lindane to the wall near the ceiling of the room and to apply heat electrically to maintain the temperature set forth, the lindane remaining substantially crystalline as set forth, although some slight melting may occur as evidenced by slight coalescence of the lindane crystals in the cup after extensive heating.

The median lethal dose (MLD) of lindane, that is, the dose that will kill 50 per cent of all exposed flies (*Musca domestica*) has been found to be 0.017 microgram. Accordingly, one gram of lindane would contain 59,000,000 fly MLD's. One gram of lindane distributed in a hermetically sealed room of 20,000 cubic feet would result in 2,950 fly MLD's or about 50 micrograms per cubic foot, or 104 MLD's or less than 2 micrograms per liter or one MLD per 9.6 c. c. of air. In fact the lindane vapor does not even remotely approach that concentration for, under operating conditions in a well ventilated room, as for instance in an auditorium, a restaurant or the like, the lindane vapor in the atmosphere would have an actual concentration little more than 4 per cent of the indicated values i. e., about 2 micrograms (which is equivalent to 120 MLD's) per cubic foot, or .08 microgram (which is equivalent to 4.7 MLD's) per liter of air.

If it is desired to fumigate a closed unoccupied room or chamber with lindane in the effort to kill not only flies and mosquitoes, but more hardy insects as well and their larvae and pupae, a much greater concentration of lindane vapor could be resorted to and to this end the temperature of the cup could be raised sufficiently to melt the lindane, provided only its temperature be maintained well below the decomposition point.

The invention is applicable not only for pest control in auditoriums, restaurants, kitchens, schools and dwelling houses, but also in box cars for food products or the like, cargo ships, factories, dairies and stables, warehouses (particularly for protection against moths), veterinarian establishments such as cat and dog hospitals, slaughter houses, poultry houses and mortuaries.

Lindane of commerce, while considerably better than 99 per cent pure gamma isomer of hexachlorocyclohexane, contains impurities which are largely traces of other than said gamma isomer. The vapor of such commercial lindane has a somewhat objectionable musty odor, that is apparently due to such impurities, which, however, pass off promptly within 24 hours of heat application and thereafter the vapor has no detectible odor. Where the plasticizers above mentioned are used as diluent, the objectionable odor of the lindane is eliminated at the outset without the need for first evaporating off the impurities in the lindane.

In summary, among the advantages of lindane for maintaining a room substantially free from insect life, are:

1. Its efficacy in effecting substantially complete kill when evaporated at the minute rate set forth, which is far below the threshold of any trace of toxicity to human beings or pets.

2. The low temperature at which it is maintained unmelted in use, by virtue of its very high heat of vaporization safeguards against injury to persons and objects by over heating and contributes to uniformity of output rate.

3. Its great economy in use, since no diluent or stabilizer is required to assure the desired extremely slow rate of evaporation, for which reason a small cup charged with 90 grams of lindane will afford pest control for from ten weeks to three months at the rate of vapor evolution of one gram per day, and accordingly requires infrequent servicing for recharging, and leaves no residue that would necessitate cleaning the cup.

All this is to be distinguished from such insecticides as DDT which for a given lethal effect require not only a melting temperature and a greater rate of dispersion, but a stabilizer or diluent as well, in order to bring the rate of evaporation to that required, so that much more frequent service is required for a given volume of insecticide with greater expense, greater hazard and the need for cleaning residue from the cups.

For certain purposes, a mixture of lindane with other compatible insecticides may be desirable. Since DDT as well as methoxychlor have a much lower vapor pressure than lindane, a mixture of lindane with either will afford more substantial deposition of the added insecticide upon the walls and other surfaces for destruction of the insect at rest, while the lindane component in its predominant vapor phase is more lethal to the insect on the wing. While the lindane evaporates more rapidly than either DDT or methoxychlor when in admixture therewith, it is given off in adequate proportions even after twenty days or more of continuous service. Where the lindane is in the proportion of 50 per cent or less by weight and the DDT or methoxychlor is 50 per cent or more, even the initial musty odor of the lindane above mentioned is eliminated.

The vaporization from the mixture of lindane and DDT or methoxychlor, results in a reduced vapor output under any given condition of use, as compared to the vaporization rate of lindane when used alone. For this reason, such admixture of DDT or methoxychlor serves incidentally to dispense with the use of the shield, guard or baffle plate above referred.

As one illustrative example of a mode of carrying out the method of the present invention, there is diagrammatically shown in the drawings an equipment comprising a receptacle 11 containing a heater cup 12, encompassed by an electric heater 13 and fed with current by conductors 14 through the mounting arm 10 for the equipment, and containing the removable anodized aluminum cup 15 for the chemical. A thermostat 16 illustratively affixed under the bottom of the heater cup 12 may be adjusted by a knob 17 exposed through the bottom of the receptacle 11. A thermometer well 18 extends under the bottom of the removable cup 15.

In carrying out the method with equipment such as just described, the thermostat would preferably be set to maintain a temperature in the well of 110 degrees C. under which condition, as above noted, sublimation is effected from the surface of the lindane in cup 15, which surface maintains the temperature of 75 to 80 degrees C. by reason largely of the high heat of vaporization of the lindane.

A baffle plate 19 (shown in dotted lines because it is infrequently required) rests upon the lindane, snugly fitting the wall of the cup 15 and presenting the central opening 20 which latter, depending upon the degree of reduction in rate of vapor evolution desired, would have a greater or lesser inner diameter.

Preferably a ring 21 is removably positioned over the rim of receptacle 11 and serves primarily to shield the surface of the lindane from the effect of drafts, as those from a nearby fan, which would tend to accelerate the desired rate of evaporation. Ring 21 has a central opening 22, which should be sufficiently large for escape of the vapor at desired rate. The main area of disc 21 slopes downward toward opening 22 as shown.

As many changes could be made in the above method, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. The method of maintaining substantially free from insect life a ventilated room suitable for occupancy by human beings which consists in applying heat to a mass of lindane in the room to maintain at the bottom of said mass a temperature of 90 to 130° C. with resultant evaporation of the lindane from the exposed surface of the mass at the rate of 0.4 to 15 micrograms per hour of continuous heat application per cubic foot of the room being treated, with resultant diffusion and convection of any condensed vapor of the compound.

2. The method of maintaining substantially free from insect life a ventilated room suitable for human occupancy by subjecting a mass of lindane of one square centimeter exposed surface area per 400 cubic feet of chamber to be treated to a temperature of about 110 degrees C. thereunder, with resultant evaporation at the rate of about 0.8 milligram per hour per square centimeter of exposed upper surface of the mass of lindane and passing the vapor into the room to be treated.

3. The method of maintaining substantially free from insect life a ventilated room suitable for human occupancy by heating within the room a mass of lindane in crystalline form, of about one square centimeter exposed surface area per 400 cubic feet of chamber to be treated, to maintain at the bottom of said mass a temperature of about 110 degrees C., with resultant sublimation of lindane at the rate of about 0.8 milligram per hour per square centimeter of exposed upper surface of the mass of lindane.

4. The method recited in claim 3 in which the rate of vaporization of the lindane is reduced by admixture therewith of inert diluent in powder form.

5. The method recited in claim 3 in which the rate of vaporization of the lindane is reduced by admixture therewith of substantially inert, diluent of diphenylphthalate.

6. The method recited in claim 3 in which the rate of vaporization of the lindane is reduced by admixture therewith of substantially inert diluent of tricresyl phosphate.

7. The method of maintaining substantially free from insect life a ventilated room for occupancy by human beings which comprises maintaining the lower part of a mass within said room, substantially solely of crystalline lindane at a temperature of about 110 degrees C., with resultant sublimation from the surface of said body at rate in the order of 0.8 milligram per hour per square centimeter of exposed surface, whereby an exposed area of lindane having a diameter of 8 centimeters will evolve approximately one gram of lindane vapor each 24 hours of continuous heating with fly killing effectiveness for a room of up to 20,000 cubic feet.

8. The method recited in claim 1 in which said temperature is maintained between 110 and 115° C. with resultant evaporation of the lindane at rate between 1 and 4 micrograms per hour.

DAVID H. CHRISTOPHER.
PHILIP J. SPEAR.

REFERENCES CITED

The following references are of record in the file of this patent:

UNITED STATES PATENTS

| Number | Name | Date |
|---|---|---|
| 1,982,358 | Smith | Nov. 27, 1934 |
| 1,990,338 | Lippert | Feb. 5, 1935 |

FOREIGN PATENTS

| Number | Country | Date |
|---|---|---|
| 584,853 | Great Britain | Jan. 24, 1947 |
| 592,788 | Great Britain | Sept. 29, 1947 |
| 621,732 | Great Britain | Apr. 19, 1949 |

OTHER REFERENCES

Busvine et al.: Ann. Applied Biol., vol. 36, pages 76–85 (1949).

Slade.: Chemistry and Industry, Oct. 13, 1945, pages 314, 319.